Oct. 21, 1952  S. A. WILSON  2,614,648
HORIZONTAL OIL AND GAS SEPARATOR
Filed April 2, 1948  2 SHEETS—SHEET 1

INVENTOR.
S. A. Wilson
BY
C. M. McKnight

Oct. 21, 1952     S. A. WILSON     2,614,648
HORIZONTAL OIL AND GAS SEPARATOR
Filed April 2, 1948     2 SHEETS—SHEET 2

INVENTOR.
S. A. Wilson
BY
C. M. McKnight

Patented Oct. 21, 1952

2,614,648

UNITED STATES PATENT OFFICE 2,614,648

HORIZONTAL OIL AND GAS SEPARATOR

Samuel A. Wilson, Tulsa, Okla., assignor to Maloney-Crawford Tank & Manufacturing Company, Tulsa, Okla., a corporation of Delaware Application April 2, 1948, Serial No. 18,646

9 Claims. (Cl. 183—2.7)

1

This invention relates to improvements in an oil and gas separator and more particularly, but not by way of limitation, to a horizontally disposed oil and gas separator adapted to separate the influent mixture flowing directly from an oil well.

The invention is generally concerned with an oil and gas separator which will provide a long horizontal travel of an incoming influent mixture at a slow velocity and providing a downward flow of the oil constituents through the force of gravity, simultaneously with an upward flow of the gaseous constituents.

It is an important object of this invention to provide an oil and gas separator which will cause an automatic and efficient releasing of entrained oil globules as the influent foamy mixture is discharged into the separator shell.

And still another object of this invention is to provide an improved oil and gas separator that will provide an initial downward travel of the heavier constituents of the influent through force of gravity and then direct the separated mixture through a long horizontal travel for efficiently breaking up the foam thereof.

And still another object of this invention is to provide an improved oil and gas separator which will initially deflect the inlet discharge of influent mixture flowing thereinto for directing the lighter gaseous vapors through a long horizontal travel and at a slow velocity and into engagement with spaced extracting units for the releasing of entrained liquids in the gaseous vapors.

And still another object of this invention is to provide an improved oil and gas separator utilizing a long horizontal travel for the influent mixture whereupon a liquid level is maintained in the separator normally having a top foam, thereby permitting entrained gases to release therefrom of their own volition.

And still another object of this invention is to provide an improved apparatus for separating oil and gas mixtures by subjecting the influent mixture to a considerably long horizontal travel throughout its flow to assure a complete and efficient scrubbing action for releasing the entrained oil globules from the lighter gaseous vapors.

And still another object of this invention is to provide an oil and gas separator efficient in its operation, simple and easy to manufacture and durable and expedient to utilize and erect.

Other objects and advantages of the invention will be evident from the following detailed description, read in conjunction with the accompanying drawings, which illustrate my invention.

Figure 1:
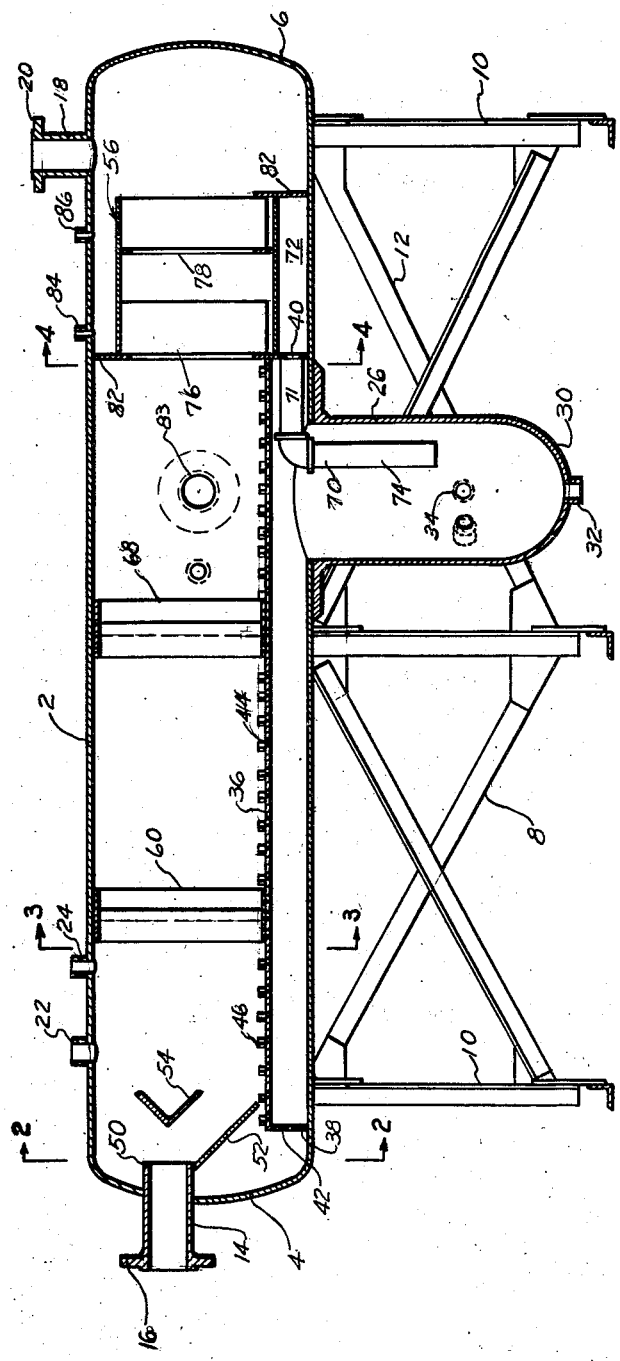
Figure 1 is a longitudinal sectional elevational view of the separator shell showing the supporting unit in side elevation.

Referring to the drawings in detail, the oil and gas separator comprises a tubular shell unit indicated by reference character 2 having closed arcuately shaped end portions 4 and 6 respectively. The shell 2 is mounted on a platform or support generally indicated at 8, and comprising a plurality of upstanding leg members 10 interconnected through cross members 12 as clearly shown in Figure 1. It will be apparent that the upper portions of the leg members are formed with a semi-circular or arcuate portion (not shown) for disposition of the horizontally disposed shell member 2. An inlet nozzle 14 having any suitable type coupling 16 communicates with the front end plate 4 of the shell 2. At a point adjacent the rear end plate 6, the shell 2 is provided with an upstanding outlet conduit 18 having a suitable coupling 20 which will be hereinafter referred to. The upper portion of the cylindrical tank 2 is provided with spaced outlet pipes 22 and 24 for receiving safety valves (not shown) as in the usual manner.

A downwardly extending circular tank 26 is secured to the outer periphery of the shell 2 by welding, or the like, and is preferably disposed at a point substantially beyond the intermediate or central point of the horizontal shell 2. The lower end of the shell 26 is provided with an arcuately shaped plate 30 having a drain outlet 32. The shell 26 is provided with an outlet aperture 34 for a purpose as will be hereinafter explained.

Figure 2:
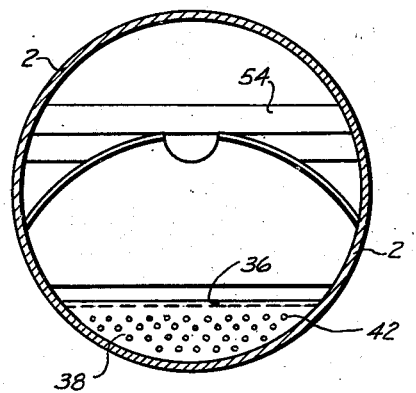
Figure 2 is a sectional view of the complete circular separator shell taken at a point indicated by lines 2—2 of Figure 1.
Figure 6:
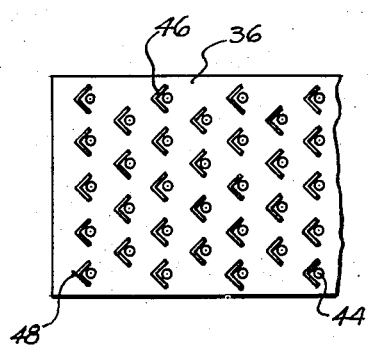
Figure 6 is a fragmentary plan view of the baffle plate.

An inverted tray member 36 having perpendicular extending end plates or leg members 38 and 40 is disposed in inverted position in the lower half of the interior of the shell 2. The front plate 38 of the inverted tray 36 is disposed beneath the inlet conduit 14 and extends substantially throughout a major portion of the shell 2. As clearly shown in Figure 2 the front plate 38 is provided with a plurality of perforations or apertures 42 for a purpose as will be hereinafter set forth. The upper plate or tray 36 (Figure 6) is provided with a plurality of apertures or perforations 44. A plurality of angle irons 46 are secured in upright position to the apertured plate 36 and immediately adjacent an aperture 44. The apex 48 of the angle irons are disposed in a direction pointing toward the inlet conduit 14 as clearly shown in Fig. 6, and for a purpose as will be hereinafter set forth. A deflector plate has a partially arcuate periphery and is secured in any suitable manner such as welding or the like to the inner periphery of the shell 2, and is preferably disposed in an angled position immediately adjacent and beneath the discharge end 50 of the inlet conduit 14. The plate 52 extends in an angled position to a point immediately above the front end of the perforated baffle or plate 36. An angled deflector plate 54 is transversely secured to the inner periphery of the shell 2, and is preferably disposed in a slight longitudinal spaced relationship and directly in alignment with the discharge aperture 50 of the conduit 14.

The perforated plate 36 extends longitudinally through the shell 2 to a point beyond the lower shell 26 where the rear end plate 40 is disposed substantially adjacent a mist extractor unit 56 as will be hereinafter referred to.

Figure 7:
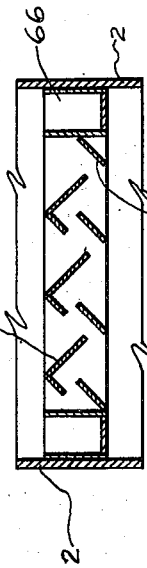
Figure 7 is a detailed view in section of one of the vane units.
Figure 3:
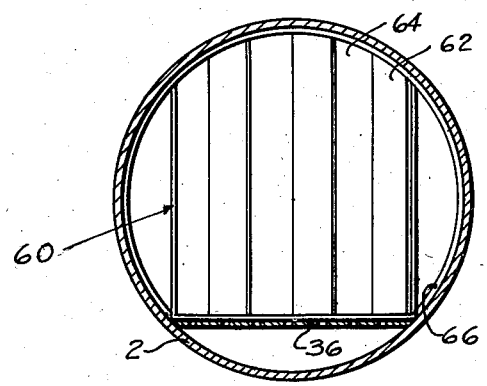
Figure 3 is a similar view taken at a point indicated by lines 3—3 of Figure 1.
Figure 4:
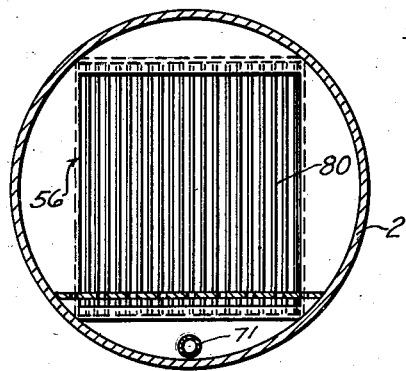
Figure 4 is a view taken at a point indicated by lines 4—4 of Figure 1.
Figure 5:
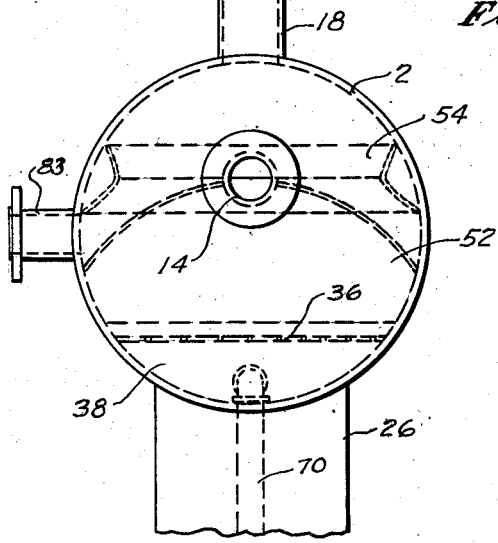
Figure 5 is a fragmentary end elevational view of the shell without the supporting means and with certain parts in dotted lines for clarity.

A vane unit 60 for scrubbing the lighter gaseous vapors is disposed above the plate 36. The vane unit 60 comprises a plurality of angularly disposed overlapping plates 62 and 64 (Fig. 7) secured at their upper and lower ends to a circular ring 66 in turn secured to the inner periphery of the shell 2 above the plate 36 (Figs. 3 and 7). A vane unit 68 of similar construction to vane unit 60 is disposed in longitudinally spaced relationship to the vane unit 60 in the interior of the shell 2 as clearly shown in Figure 1. The vane unit 68 is constructed substantially identical with that of unit 60 for the purpose of scrubbing the gaseous vapors as will be hereinafter set forth.

A right angle conduit 70 is disposed in the bottom of the shell 2 having one leg 71 extending through the end plate 40 into communication with the chamber 72 adjacent the mist extractor 56. The opposite leg 74 extends vertically downward in the shell 24. It will be apparent that the angled conduit 70 provides communication with that portion of the shell adjacent the mist extractor 56 and the oil outlet shell 26 in order to provide an outlet for broken up oil globules of the gaseous vapors passing through the extractor unit 56.

The mist extractor unit generally indicated at 56 is disposed at one end of the shell 2 and comprises a plurality of open ended units 76 and 78 arranged in longitudinally spaced relation. The mist extractor unit is of a construction somewhat similar to that shown in the M. F. Waters Patent No. 2,276,277 issued March 17, 1942 and comprises a plurality of undulated vanes 80 permitting passage of the light gaseous vapors therethrough in order to thoroughly scrub the vapors and release any entrained oil globules in the gases, and which are permitted to fall to the chamber 72 and be discharged through the pipe 71. The extractor units 76 and 78 permit passage of the gases therethrough and out the open rear end thereof in order to be discharged through the outlet conduit 18. Suitable brackets 82 are shown for securing the extractor unit 56 to the inner periphery of the shell 2. The spaced relation between the units 76 and 78 provides for additional expansion and drying out of the flowing gases.

Operation

The influent mixture coming from the well consisting of a mixture of oil and gas flows through the inlet conduit 14 and out of the discharge end 50, where it impinges against the angle plate deflector 54 creating an initial and partial separation to cause the gaseous constituents to travel upwardly due to their lighter gravity, while the oil constituents are directed downwardly through the force of gravity onto the deflector plate 52 and onto the perforated plate or baffle 36. The heavier constituents in many instances is a foamy mixture and is permitted to flow longitudinally along the plate and through the shell 2, and as such comes in contact with the angle irons 46 surrounding the apertures 44 of the plate 36. The scrubbing contact of the foamy mixture with the angle irons effects a considerable breaking up of the foam mixture, simultaneously with a flow through the apertures 44 to the bottom of the shell 2 below the plate 36.

The oil level is preferably maintained immediately beneath the lower face of the plate 36. Any heavier constituents that are not caught by the deflector plate 52 in the initial inlet of the influent mixture are permitted to flow through the perforations 42 of the front plate 38. The continued inlet of the influent mixture moves the separated oil globules longitudinally through the shell 2 for discharge into the shell 26, and hence through the discharge outlet 34 to any convenient storage means or the like (not shown).

After the initial breaking by the deflector 54, the lighter gaseous constituents of the mixture move therearound and through the upper portion of the shell 2 into contact with the vane unit 60 where they receive a partial scrubbing to break up and release entrained oil particles therein, which are permitted to drop by gravity on the plate 36 and through the apertures 44. The continued flow of the gaseous vapors contact the second vane scrubbing unit 68 where the separation is repeated to cause a further scrubbing of the gaseous fluids, and, hence through the mist extractor unit 56 for complete separation to be discharged through the outlet conduit 18. The scrubbing of the gaseous fluids by the vanes 80 of the mist extractor unit 56 further releases any entrained globules of oil which fall by gravity to the chamber 72, and thus flow through the conduit 70 into the lower tank 26 and be discharged through the outlet 34.

A conduit 83 communicates with the shell 2 at one side thereof and is adaptable for receiving any suitable liquid level control apparatus (not shown). Furthermore, the shell is provided with outlet passageways 84 and 86 adapted to receive a pressure gauge and safety head (not shown).

It will thus be seen that the present invention provides a horizontally disposed oil and gas separator having an initial separation of the inlet influent mixture with a subsequent long and extended travel of the lighter gaseous vapors, as well as the released oil globules thereof throughout the horizontally disposed longitudinal length of the separator, and at a slow velocity to provide a more efficient scrubbing and separation of the mixture. Furthermore, the gaseous vapors and the released oil globules are directed into contact with numerous scrubbing units in order to effect a substantially complete and efficient separation of the gas and oil mixture.

The separator shell is preferably mounted on the platform 8 and as such, provides for a simpler and easier manner to mount the separator shell in condition for operation. Furthermore, the horizontal disposition provides for easy portability by facilitating the transfer of the unit to a truck for movement, if desired.

Changes may be made in the specification and drawings without departing from the spirit of the invention within the scope of the following claims, as set forth.

What I claim is:

1. In an oil and gas separator comprising a horizontally disposed tank, an influent inlet provided at one end of the tank for directing influent mixture into the tank in a horizontal path to cause an initial separation whereby the heavier constituents are directed downward by gravity and the lighter constituents are directed in a substantial longitudinal path in the upper portion of the tank, a means for guiding the downwardly traveling liquids through a longitudinal path throughout the tank, baffle means for scrubbing the liquids during their longitudinal flow within the tank, means for diverting the inlet gaseous vapors, a plurality of scrubbing vanes horizontally spaced within the tank and adapted for scrubbing the lighter vapors flowing horizontally therethrough in order to free the heavier constituents therein, and separate outlet means provided in the tank for the vapor and liquids.

2. In an oil and gas separator comprising an elongated non-vertical shell, an influent inlet at one end of the shell, an angled deflector plate arranged in spaced relation adjacent the inlet, an angularly disposed baffle arranged adjacent the inlet nozzle and extending downwardly therefrom, a scrubbing plate longitudinally disposed in the lower portion of the shell and having a front end in substantial contact with the baffle, said plate having end leg portions for maintaining the plate in spaced relation with the inner periphery of the shell, a plurality of perforations in the plate, a plurality of angle iron members disposed adjacent each perforation for scrubbing the flowing liquid mixture prior to entering an adjacent perforation, a plurality of vane units arranged in horizontally spaced relationship and disposed in the shell above the perforated plate, a mist extractor unit in the shell at the end opposite the inlet, and outlet means for the separated oil and gas.

3. The method of separating oil and gas which consists of directing an influent mixture into a tank in a horizontal path for initially directing the heavier liquids in a downward path due to gravity and the lighter vapors longitudinally through the upper portions of the tank, directing the downward traveling liquids in an elongated horizontal path, scrubbing the heavier liquids during their horizontal travel prior to settling in the tank, conducting the gaseous vapors in an elongated horizontal path in the upper portion of the tank, subjecting the horizontally traveling gases to a plurality of scrubbing operations for freeing them of heavier constituents, conducting the heavier liquids from the tank, and carrying off the gas from the upper-most portion of the tank.

4. In an oil and gas separator comprising a horizontally disposed tank, an influent inlet provided at one end of the tank for directing an influent mixture into the tank in a horizontal path to cause an initial separation whereby the heavier fluids are directed downward by gravity and the lighter fluids are directed through the upper portion of the tank, a baffle plate disposed transversely in the tank below the inlet for guiding the heavier fluids downwardly, a scrubbing plate below the baffle plate for receiving the heavier fluids and longitudinally disposed in the lower portion of the tank and in spaced relation from the inner periphery thereof, a plurality of perforations in the scrubbing plate, a plurality of angle irons disposed on the scrubbing plate for additionally scrubbing the heavier fluids during their travel therealong, a plurality of horizontally spaced vane units provided in the tank for scrubbing the lighter fluids during their travel longitudinally therethrough, and separate outlets for the separated fluids.

5. In an oil and gas separator comprising a horizontally disposed tank, an influent inlet provided at one end of the tank for directing an influent mixture into the tank in a horizontal path to cause an initial separation whereby the heavier fluids are directed downward by gravity and the lighter fluids are directed through the upper portion of the tank, a baffle plate extending downwardly from the inlet for guiding the heavier fluids downwardly, a scrubbing plate below the baffle plate longitudinally disposed in the lower portion of the tank and in spaced relation from the inner periphery thereof, a plurality of perforations in the scrubbing plate, a plurality of angle irons disposed on the scrubbing plate for additionally scrubbing the heavier fluids during their travel therealong, and separate outlet means for the separated fluids.

6. In an oil and gas separator comprising a horizontally disposed tank, an influent inlet provided at one end of the tank for directing an influent mixture into the tank in a horizontal path, means to cause an initial separation whereby the heavier fluids are directed downward by gravity and the lighter fluids are directed through the upper portion of the tank, a baffle plate extending downwardly at an angle from the inlet for guiding the heavier fluids downwardly, a scrubbing plate below the baffle plate longitudinally disposed in the lower portion of the tank and in spaced relation from the inner periphery thereof, a plurality of perforations in the scrubbing plate, a plurality of angle irons disposed on the scrubbing plate for additionally scrubbing the heavier fluids during their travel therealong, a plurality of scrubbing units for additionally scrubbing the lighter fluids to free entrained heavier fluids therein, and separate outlets for the separated fluids.

7. In an oil and gas separator comprising a horizontally disposed tank, an influent inlet provided at one end of the tank for directing an influent mixture into the tank in a horizontal path, means to cause an initial separation whereby the heavier fluids are directed downward by gravity and the lighter fluids are directed through the upper portion of the tank, a transversely disposed baffle plate extending downwardly at an angle from the inlet for guiding the heavier fluids downwardly, a scrubbing plate longitudinally disposed in the lower portion of the tank below the baffle plate, a plurality of perforations in the scrubbing plate, a plurality of angle irons disposed on the scrubbing plate for additionally scrubbing the heavier fluids during their travel therealong, outlet means for discharging the heavier fluids from the tank, a mist extractor for scrubbing the lighter fluids, communicating means between the mist extractor and the outlet means to cause discharge of the heavier liquids freed in the mist extractor into the outlet means, and means for discharging the lighter fluids from the tank.

8. The method of separating oil and gas in a two plane horizontal path which consists of directing an influent mixture into a horizontal tank for initially directing the heavier liquids in a downward path due to gravity and the lighter vapors longitudinally through the upper portions of the tank, directing the downwardly traveling liquids through a lower portion of the tank in an elongated horizontal path, scrubbing the heavier liquids during their horizontal travel prior to settling in the tank, conducting the gaseous vapors in an elongated horizontal path in the upper portion of the tank, subjecting the horizontally traveling gases to a plurality of scrubbing operations for freeing them of heavier constituents, conducting the heavier liquids from the tank, and carrying off the gas from the uppermost portion of the tank.

9. In an oil and gas separator comprising an elongated horizontally disposed tank adapted for upper and lower planes of separation of the influent mixture, an influent inlet for the tank causing an initial separation of the heavier liquids of the mixture, means for directing the heavier liquids into a lower portion of the tank, means for scrubbing the heavier liquids in an elongated horizontal path throughout a lower portion of the tank, means for scrubbing the gaseous vapors in a horizontal path throughout an upper portion of the tank, and independent means for carrying off the separated vapors and liquids.

SAMUEL A. WILSON.

REFERENCES CITED

The following references are of record in the file of this patent:

UNITED STATES PATENTS

| Number | Name | Date |
|---|---|---|
| 1,752,215 | Waters | Mar. 25, 1930 |
| 2,349,944 | Dixon | May 30, 1944 |